US012358123B2

(12) United States Patent
Morris et al.

(10) Patent No.: US 12,358,123 B2
(45) Date of Patent: Jul. 15, 2025

(54) ADJUSTABLE CLAMPING STORAGE SYSTEM

(71) Applicants: Craig Morris, Ramsey, MN (US); Rhonda Morris, Ramsey, MN (US)

(72) Inventors: Craig Morris, Ramsey, MN (US); Rhonda Morris, Ramsey, MN (US)

(73) Assignees: Craig Morris, Ramsey, MN (US); Rhonda Morris, Ramsey, MN (US)

( * ) Notice: Subject to any disclaimer, the term of this patent is extended or adjusted under 35 U.S.C. 154(b) by 215 days.

(21) Appl. No.: 17/961,012

(22) Filed: Oct. 6, 2022

(65) Prior Publication Data

US 2023/0112821 A1 Apr. 13, 2023

Related U.S. Application Data

(60) Provisional application No. 63/253,229, filed on Oct. 7, 2021.

(51) Int. Cl.
*B25H 3/04* (2006.01)

(52) U.S. Cl.
CPC .................................... *B25H 3/04* (2013.01)

(58) Field of Classification Search
CPC .......... F16B 2/10; F16B 2/065; A47F 5/0846; A47L 13/512; B25H 3/04; Y10T 24/44299; Y10T 24/44504; Y10T 24/44513; B25B 5/04
USPC ............. 248/316.1, 113, 689, 229.13, 316.5; 211/94.01, 70.6; 269/164, 43, 45, 254 CS
See application file for complete search history.

(56) References Cited

U.S. PATENT DOCUMENTS

| | | | | | |
|---|---|---|---|---|---|
| 338,248 | A * | 3/1886 | Capron | A47L 13/512 | 248/113 |
| 1,073,679 | A * | 9/1913 | Haussman | F16M 13/02 | 248/316.5 |
| 1,078,805 | A * | 11/1913 | Schahl | F16M 13/02 | 248/316.5 |
| 1,246,492 | A * | 11/1917 | Thiele | A47L 13/512 | 248/113 |
| 6,435,357 | B1 * | 8/2002 | Lee | B25H 3/04 | 211/94.01 |
| 7,669,723 | B2 * | 3/2010 | Kao | B25H 3/04 | 206/349 |
| 7,708,248 | B2 * | 5/2010 | Lagobi | A47G 23/0225 | 248/231.21 |
| 7,717,278 | B2 * | 5/2010 | Kao | B25H 3/04 | 206/349 |
| 7,753,216 | B2 * | 7/2010 | Kao | B25H 3/04 | 211/70.6 |
| 7,861,871 | B2 * | 1/2011 | Kao | A47F 7/0028 | 206/349 |

(Continued)

*Primary Examiner* — Ingrid M Weinhold
(74) *Attorney, Agent, or Firm* — Westman, Champlin & Koehler, P.A.; Amanda M. Prose

(57) ABSTRACT

An adjustable holder assembly and a track for supporting a plurality of holder assemblies thereon where each holder assembly adjusts to hold objects of various sizes, weights, dimensions, shapes and uses. The track slidably supports a plurality of holder assemblies spaced apart thereon. For example, the holder assemblies may each hold a different object and the spacing between each holder assembly adjusted to accommodate the objects held therein and/or hanging therefrom without interference from adjacent objects.

8 Claims, 26 Drawing Sheets

(56) References Cited

U.S. PATENT DOCUMENTS

| | | | | |
|---|---|---|---|---|
| 7,950,534 | B2 * | 5/2011 | Kao | A47F 5/0846 211/94.01 |
| 8,302,786 | B2 * | 11/2012 | Kao | A47F 5/0846 211/70.6 |
| 8,720,841 | B2 * | 5/2014 | Morren | F16B 2/10 248/229.23 |
| 9,205,552 | B2 * | 12/2015 | Kao | F16M 13/022 |
| 9,591,931 | B1 * | 3/2017 | Oren | A47B 96/1466 |
| 9,597,792 | B1 * | 3/2017 | Kao | B25H 3/04 |
| 9,744,673 | B1 * | 8/2017 | Gordon | B25B 5/04 |
| 9,925,657 | B1 * | 3/2018 | Kao | B25H 3/04 |
| 9,962,827 | B2 * | 5/2018 | Kao | B25H 3/04 |
| 10,875,173 | B1 * | 12/2020 | Kao | B25H 3/003 |
| 2006/0243686 | A1 * | 11/2006 | Grayson | A47B 81/005 211/70.6 |
| 2008/0000853 | A1 * | 1/2008 | Huang | A47F 7/0028 211/70.6 |
| 2009/0090644 | A1 * | 4/2009 | Kao | B25H 3/04 206/373 |
| 2010/0300996 | A1 * | 12/2010 | Kao | B25H 3/04 211/70.6 |

* cited by examiner

ADJUSTABLE CLAMPING STORAGE SYSTEM

CROSS-REFERENCE TO RELATED APPLICATION

This application claims priority to and the benefit of U.S. provisional patent application Ser. No. 63/253,229, filed on Oct. 7, 2021, the contents of which are incorporated herein in their entirety.

BACKGROUND

The present invention relates to a holder assembly and track system. More specifically, the holder assembly automatically adjusts to hold various shaped and sized items and a plurality of holder assemblies can be slidably provided on a track.

Currently, "snap-in" or "snap-out" devices for holding objects are limited in size to holding items having a long handle with a minimal circumference. Moreover, these snap-in or snap-out devices are capable of holding lighter weight items such as brooms, mops, shovels or the like. The arms which provide the clamping force in "snap-in," and "snap-out devices" cannot accommodate a wide variety of objects. The arms are also prone to breakage and the forming of weak spots in the plastic overtime as items of a larger size are held by these systems.

SUMMARY

An aspect of the present disclosure relates to a storage system for one or more objects. The storage system includes a housing having a top portion and a bottom portion and an outer rear surface having at least one protrusion extending along a length of the outer rear surface; a pair of opposed clamping arms extending outwardly from a front face of the housing and wherein each arm has an angled object contact surface for contacting the object and forcing the arms apart when the object is forced into a space between the opposing clamping arms, and wherein each arm is a spring biased arm; and a track having a height and a depth. The housing is slidably connected to and removably supported on the track and wherein the track is mountable to an upright surface.

The at least one protrusion extending along the length of the outer rear surface of the housing is configured to mate with at least one channel extending along a first surface of the track.

The housing further comprises a clamp adjustment mechanism for selectively increasing or decreasing a distance between each arm in the pair of opposed clamping arms to allow the arms for clamping objects of varying sizes between the arms. The clamp adjustment mechanism comprises a wedge positioned in the housing and between ends of the opposed clamping arms within the housing and wherein the wedge is moveable with respect to a stationary mount at a rear of the housing by way of rotation of an adjustment screw.

The housing and the pair of opposed clamping arms are constructed of high-density polyethylene. The contact surface of each arm of the opposed clamping arms is provided with a rubberized coating or cover.

A stabilization adjustment mechanism is provided for securing the housing to the track in such a manner as to prevent tilting of the housing with respect to the track. The stabilization adjustment mechanism comprises a bolt and a knob wherein rotation of the knob rotates the bolt extending through the housing to secure the housing in a manner in which forward and backward tilt is prevented.

The arms are configured to clamp an object having a circumference in the range of approximately ¾ inches to approximately 7 inches.

The opposed clamping arms are configured to hold an object having a weight of up to 35 lbs or more.

In one more embodiments, an adapter having a front surface is provided for coupling to the at least one protrusion extending along the length of the outer rear surface of the housing and a rear surface that is configured to couple to the channel such that the adapter couples the housing to the track.

The housing is a first housing slidably connectable to the track and further comprising additional housings also slidably connectable to the track.

In one or more embodiments, the object is a power tool, hand tool, kitchen tool, cookware or combination thereof.

In one or more embodiments, the upright surface is a wall or other surface in a kitchen, closet, mobile workspace, warehouse, mobile service unit, food truck, utility vehicle, or garage. In one or more embodiments, the system may also include a shelf configured for mounting to the wall and spaced apart from the track, the shelf having a horizontal support surface and a back wall providing one or more AC/DC power outlets, USB ports, or combinations thereof.

Another aspect of the present disclosure relates to an adapter for securing a clamping mechanism to a wall mount comprising a main body having a length, a height and a depth with a front surface for coupling to the clamping mechanism and a second surface for coupling the wall mount, and an aperture in a bottom surface for receiving a locking mechanism for securing the main body to the wall mount.

The adapter slidably couples to the clamping mechanism and wherein the clamping mechanism comprises a housing supports opposing clamping arms thereon.

The main body is comprised of high-density polyethylene.

Yet another aspect of the present disclosure relates to a multi-use shelf having a first horizontal surface for supporting one or more items thereon and a lip extending around at least a portion of a perimeter of the first horizontal surface; a back wall to the first horizontal surface, wherein the back wall has a depth providing a cavity on a face of the back wall opposite the first horizontal surface; a back cover for enclosing the cavity; and one or more electrical receptacles, USB ports, or combinations thereof provided in the backwall and accessible from the first horizontal surface.

The shelf is configured to mounting to a vertical surface and wherein objects being connected to one of the one more electrical receptacles, USB ports, or combinations thereof are supported by the first horizontal surface.

DETAILED DESCRIPTION

Figure 1:
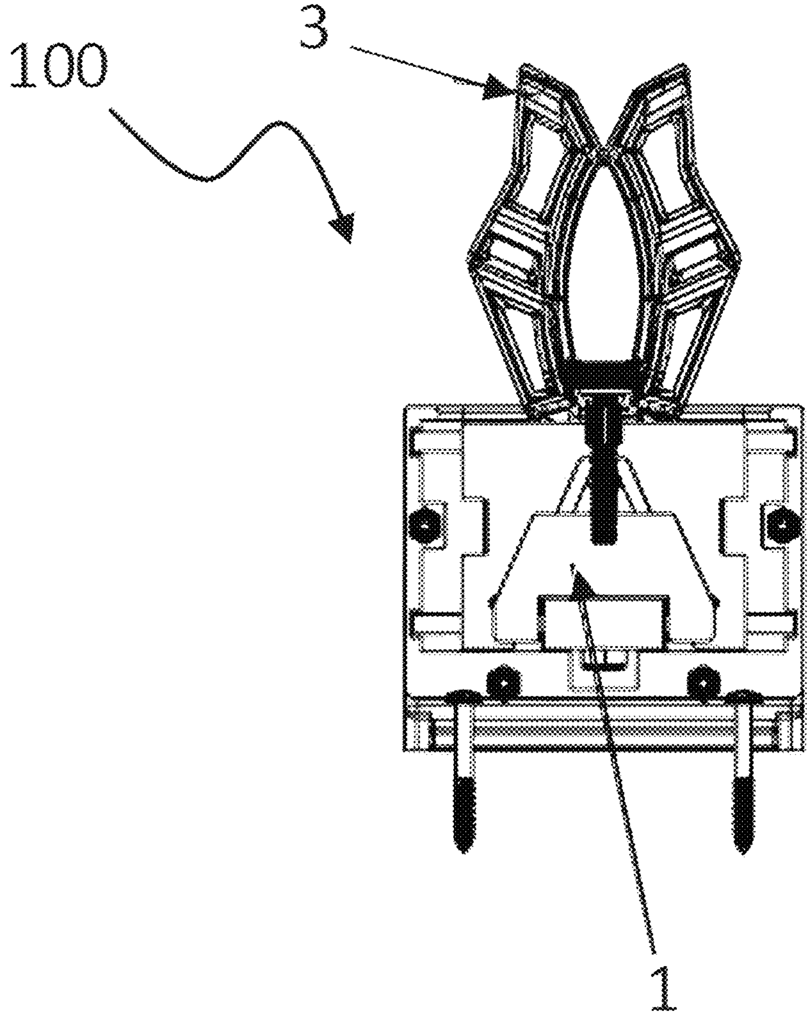
FIG. 1 is a side view of a holder assembly.
Figure 2:
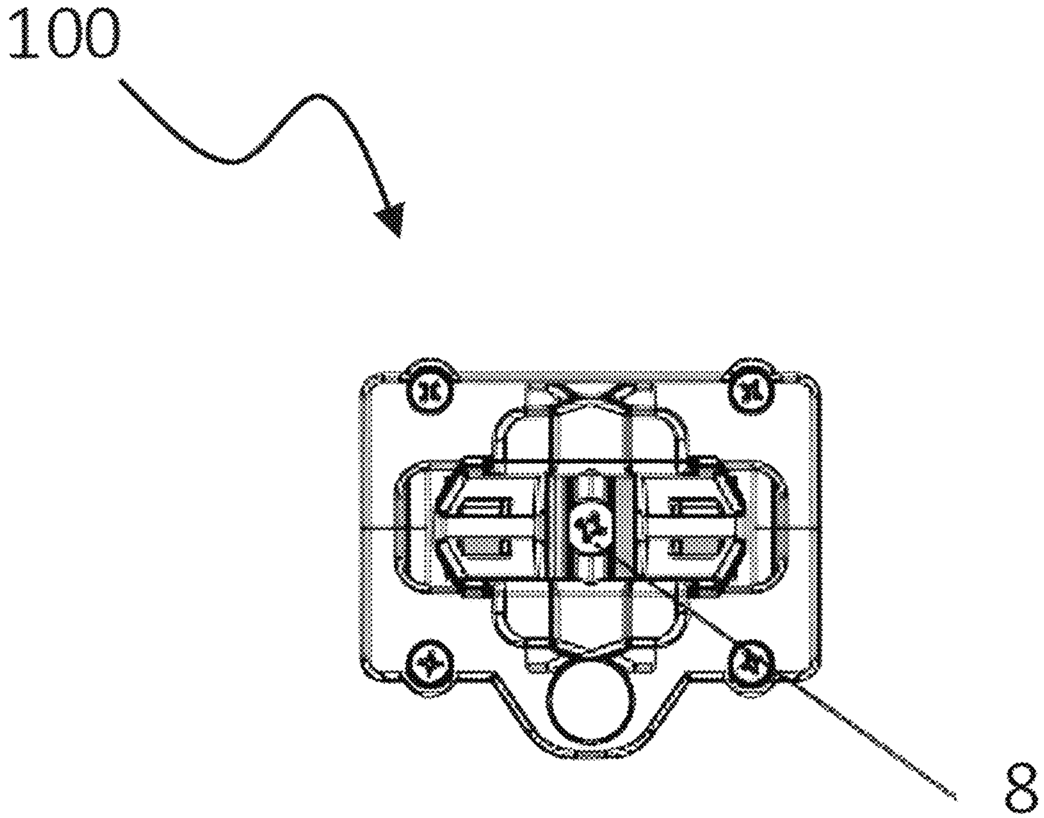
FIG. 2 is a top view of the holder assembly showing the adjustment mechanism of the holder assembly.
Figure 3A:
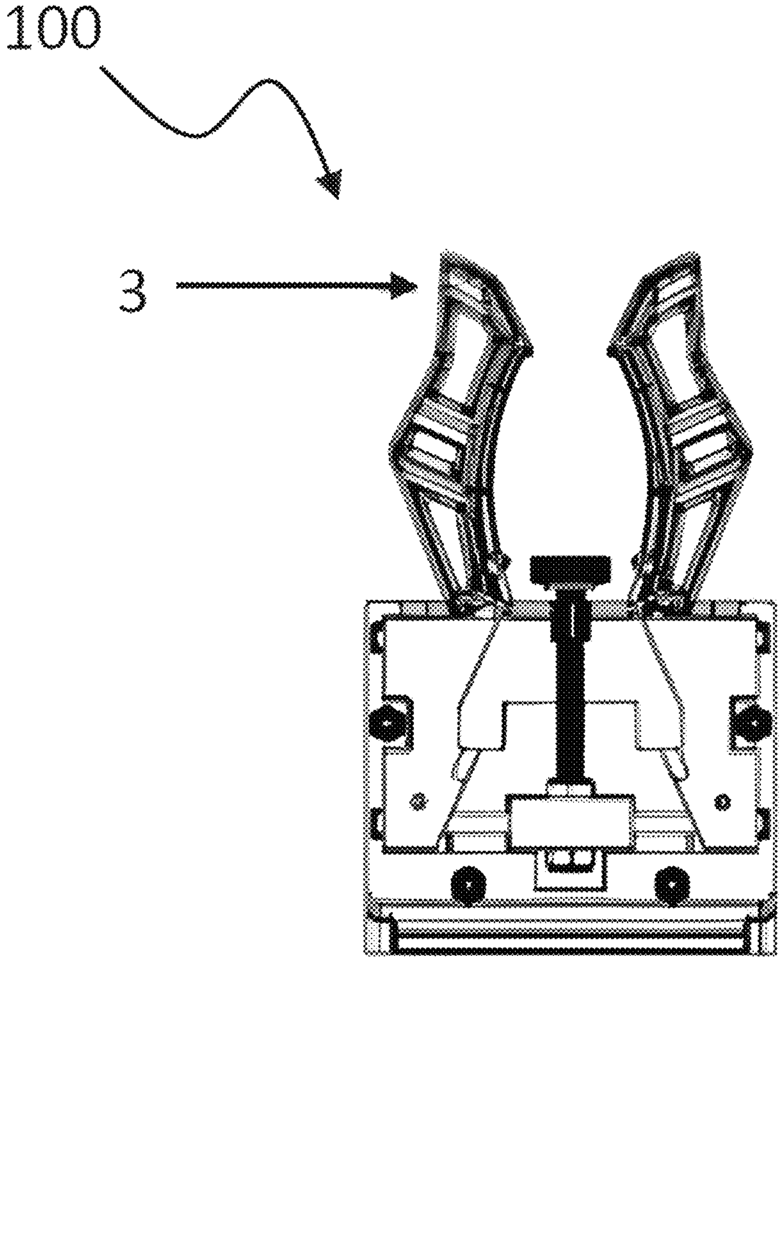
FIG. 3A is a side view of the holder assembly adjusted outwardly for accommodating objects of increased diameter.
Figure 3B:
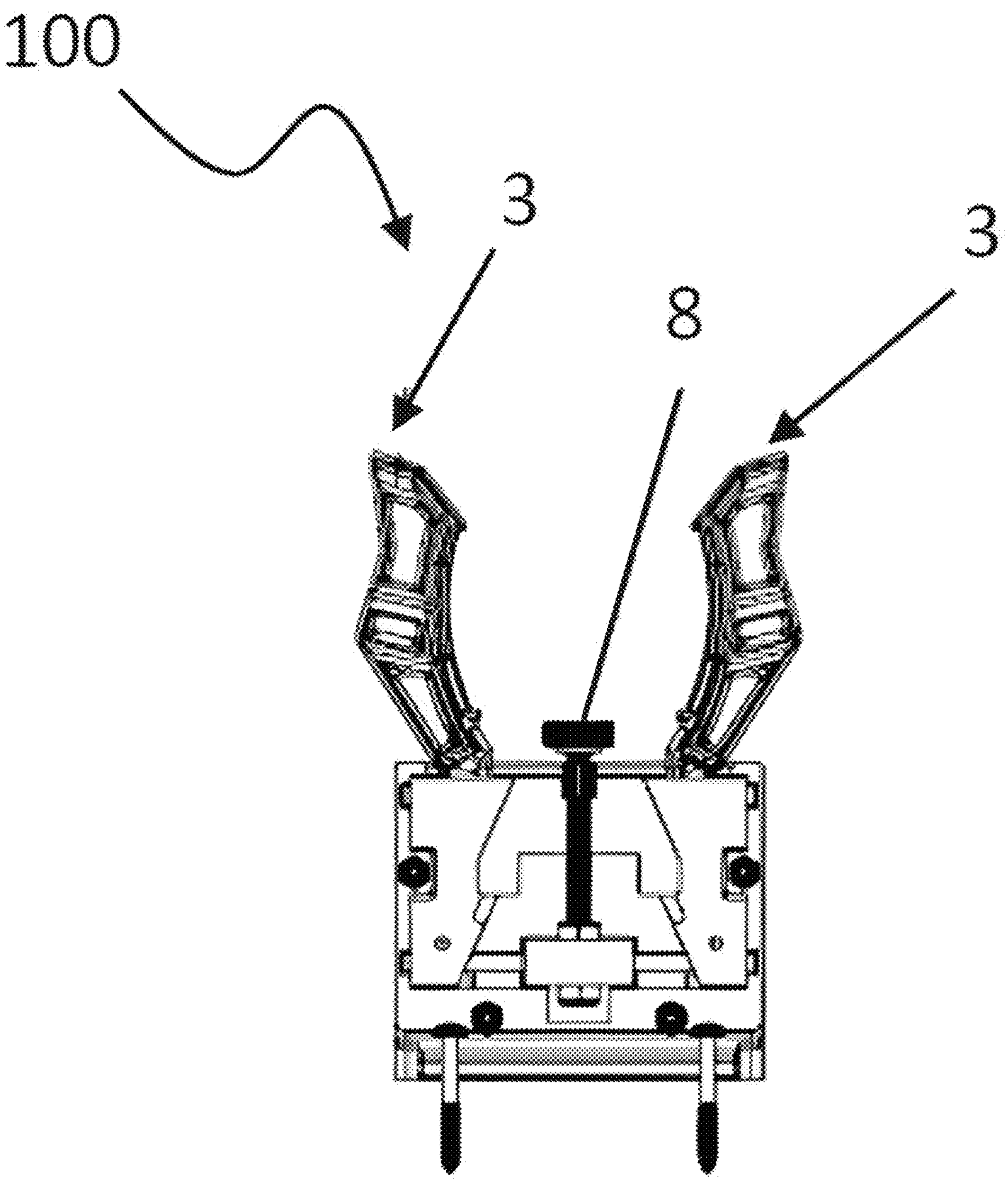
FIG. 3B is a side view of the holder assembly showing pivoting of arms and an adjustment mechanism.
Figure 4:
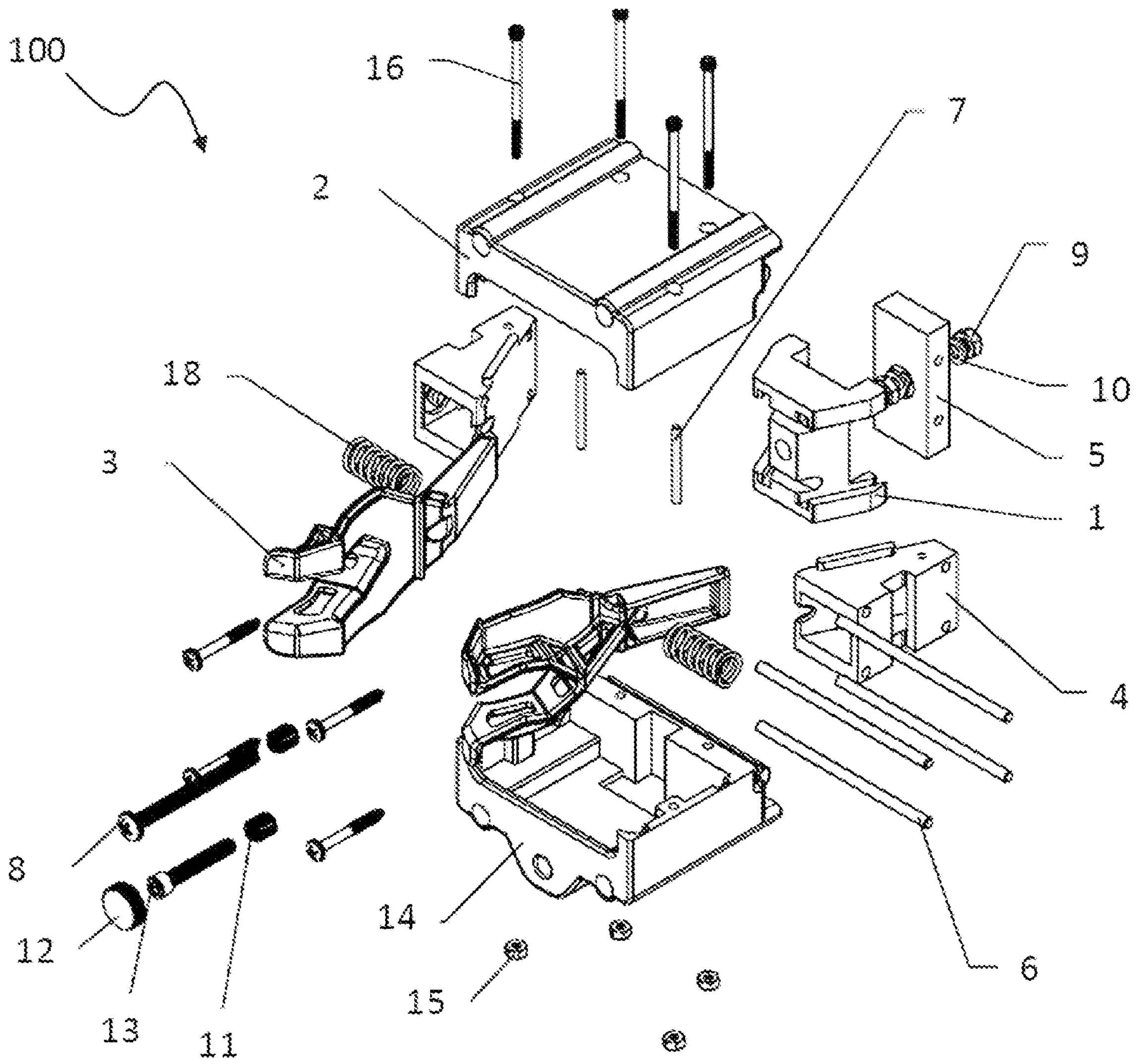
FIG. 4 is an exploded view of the holder assembly.

A holder assembly and a track for supporting a plurality of holder assemblies thereon is described herein. The holder assembly is configured to automatically adjust to hold objects of various sizes, weights, dimensions, shapes and uses. The track slidably supports a plurality of holder assemblies spaced apart thereon. For example, the holder assemblies may each hold a different object and the spacing between each holder assembly adjusted to accommodate the objects held therein and/or hanging therefrom without interference from adjacent objects.

The holder assembly and/or the holder assembly and track system can be used in a variety of settings including but not limited to houses, garages, workshops, within service vehicles, inside food trucks, on boats, in sports facilities, or storage closets. The holder assembly can hold objects such as any object having a handle or a neck portion with a dimension such as a circumference of 7 inches or less, various power tools, hand tools, cook ware, sporting goods, cleaning items The holder assembly is mountable directly to a surface such as an upright surface, a substantially flat surface, or a wall. The holder assembly is also configured for mounting to a track wherein the holder can be slidably mounted to the track and the track then mounted to the surface such as the upright surface, flat surface, or wall. In one embodiment, a system for storage of various sized items includes at least one holder assembly and a track for supporting one or more holder assemblies thereon. The track can be configured to hold up to six or more holder assembly spaced apart thereon.

Each holder assembly is configured to grasp and securely hold various items which may range in size from approximately ¾ inches to approximately 7 inches when measuring across the item.

The holder assembly is configured to operably mount to a track, such as a channeled bracket track for adjustability. When operably mounted to the track, the holder assembly is slidable in reciprocal directions along a length of the track and as such, one or more holder assemblies can be installed on and supported by the track and the spacing between the holder assemblies adjusted to accommodate objects in adjacent spaced apart holder assemblies where the objects may have various shapes and sizes.

The holder assembly has a base for mounting and arms for holding objects where the holder assembly is adjustable such that objects removably held by the holder assembly can be prevented from rotating and/or swinging when held in the holder. The arms are also adjustable to change the width or spacing between the arms for sturdily holding objects of different sizes between the arms. The arms are configured with angled surfaces for receiving objects such that as an object is pressed therebetween and into the space between the arms, the object separates the arms until the object is slide past the angle surfaces, which then close and/or clamp onto the object to secure the object in place.

The holder assembly may also be provided with an adjustable lock or securing mechanism which may be an adjustment mechanism such as a screw or moveable device which allows a user to adjust tension provided by a bias spring to one or both arm. This also a user to adjust clamping pressure between the arms for larger or smaller objects.

One or more elements or components of the holder assembly may be provided with a sleeve or otherwise coated with a protective element to reduce friction and soften surfaces to prevent damage to objects held in the holder assembly. Such protective elements may comprise a rubberized surface, silicon surface, a rubberized neoprene surface or combinations thereof which reduces or eliminates the potential for the holder assembly to scratch or damage an object removably secured in and held by the holder assembly. As the holder assembly is configured to hold large and small, light and heavy objects of varying dimensions and sizes, the holder assembly is constructed of a material that provides strength and durability to the holder such as HDPE, HDPE with nylon for added elasticity or other like materials and the protective element provided to object contact surfaces aids in protecting the arms and the objects held therein. In one or more embodiments, the holder assembly is configured to hold an item up to 38 pounds.

The holder assembly described herein can be mounted directly to a surface, for example a wall surface, with one or more fasteners such as screws.

The holder assembly may also be provided with a snap on adapter which allows the holder assembly to be operably clamped onto tracks of different constructions and/or third-party pre-existing tracks.

In one or more embodiments, the holder assembly may be used with a mounting adaptor wherein, the adaptor allows the holder assembly to be operably connected to preexisting tracks manufactured by third parties.

The holder assembly described herein, and the holder assembly and track system are mountable in various environments and on various surfaces, not limited to upright or wall surfaces although the term "upright surface" may be used throughout this disclosure, this is for ease of illustration and the mounting of the holder assembly and/or track is not so limited. The assembly and systems described herein are mountable in service vehicles, mobile work stations, garages, residential settings, or homes, commercial facilities, manufacturing facilities, industrial settings, for example.

A multi-use docking station may also be used alone or in combination with the holder assembly and track described herein. The multi-use docking station may comprise one or more power outlets, including a combination of AC/DC power, a plurality of electrical plug-ins, batteries, as well as USB ports. The multi-use docking station also provides a storage solution which supports up to 50 pounds in weight thereon.

In further detail in one embodiment, a holder assembly 100 is illustrated in FIGS. 1-6. The holder assembly 100 comprises a housing have a top portion 2 and a bottom portion 14 which support a pair of arms or jaws 3 thereon and an adjustment mechanism 1, 8 for adjusting the arm 3 spacing. The arms 3 are spring 18 biased arms. The top portion 2 and bottom portion 14 of the housing may be secured together with one or more components of the assembly 100 therein or partially therein, and the housing portions 2 and 14 are secured with a fastener system 15, 16.

The housing together supports and/or contains the elements of the holder assembly 100. As the housing supports one or more moveable, piovotal and adjustable components therein, shafts or rod 6, 7 may be used to operably connect and/or secure one or more elements within the housing. Each arm 3 comprises one or more object-contact surfaces which may be angled and substantially smooth such that these contact surfaces allow an object to be pushed into a space between the arms 3 and held there between. The contact surfaces allow the inward force of the object to push open and separate the arms 3, which then return to a closed position around the object as the object moves past the contact surfaces. The arms 3 in the pair of arms are opposingly mounted on the housing so that the arms 3 close toward one another.

The adjustment mechanism comprises a wedge 1 and an adjustment screw 8 where the arms 3 are adjustable by way of the movement of the wedge 1, which is movable in reciprocal directions (e.g., in and out) to allow the arms 3 to adjust for smaller or larger objects. This adjusts the initial spacing between the arm 3 when no object is held therebetween. The arms 3 and wedge 1 may together be referred to throughout this disclosure as a “clamp assembly” which may further comprise a stationary mount 5 wherein the adjustment screw 8 passes through the adjustment wedge 1 and the stationary mount to a washer 10 and lock nut 9 for fastening. This allows for the adjustment of the wedge 1 in the “in and out” manner as biased by the stationary mount 5.

A clamp assembly housing 4 is also provided for supporting and securing each arm 3 at its base and operably within the housing.

An anti-tip mechanism is provided to the holder assembly 100 and comprises an anti-tip adjustment mechanism 13 having a knob 12 for ease of manual adjustment. The adjustment mechanism 13 extends from a space between the arms 3 and into the housing to secure the housing to a track for example in a manner that prevents tipping or forward movement of the housing when objects are held between the arms 3. The anti-tip adjustment mechanism may be a rotatable adjustment mechanism such as a bolt or screw and provided with an insert for operable use such as a brass insert 11 which may also be a threaded insert.

One or more elements of the holder assembly such as the housing portions 2, 14, clamp assembly housing 4, and/or stationary mount 5 may be constructed from HDPE or other high strength plastic materials and may be made by way of high-pressure injection molding. The assembly 100 and/or its components may also be made by three-dimensional printing. Other components such as spring 18 and fasteners may be those known in the art such as screws, nuts and bolts and would be otherwise be made from metal or alloy materials.

Figure 5A:
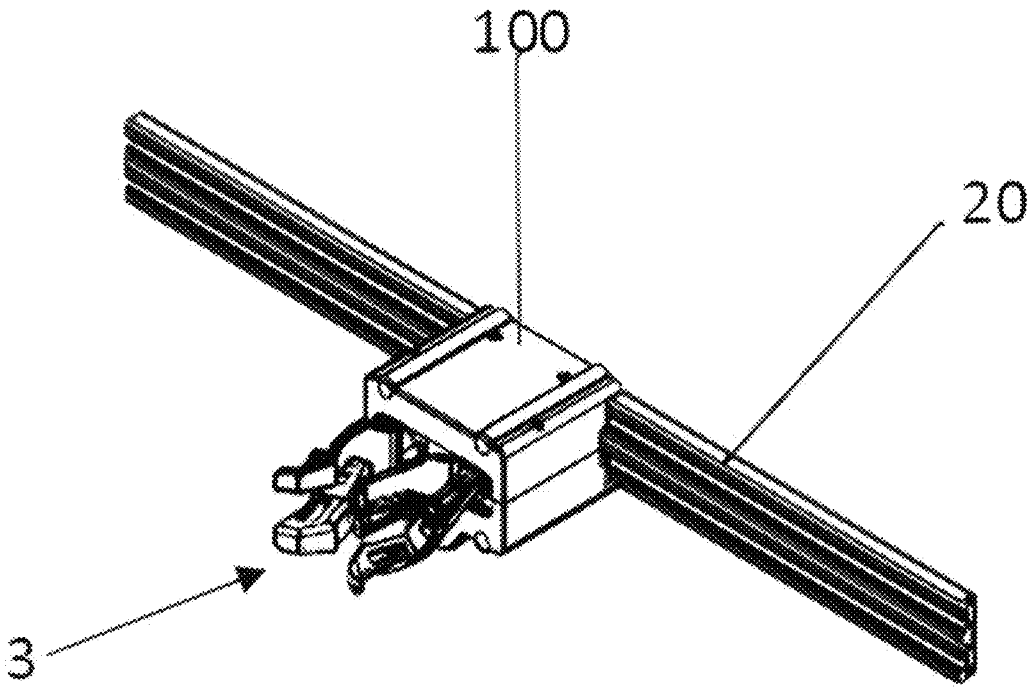
FIGS. 5A-5C show the holder assembly and a track system for mounting of one or more holder assemblies and how the holder assembly mounts to the track.
Figure 5B:
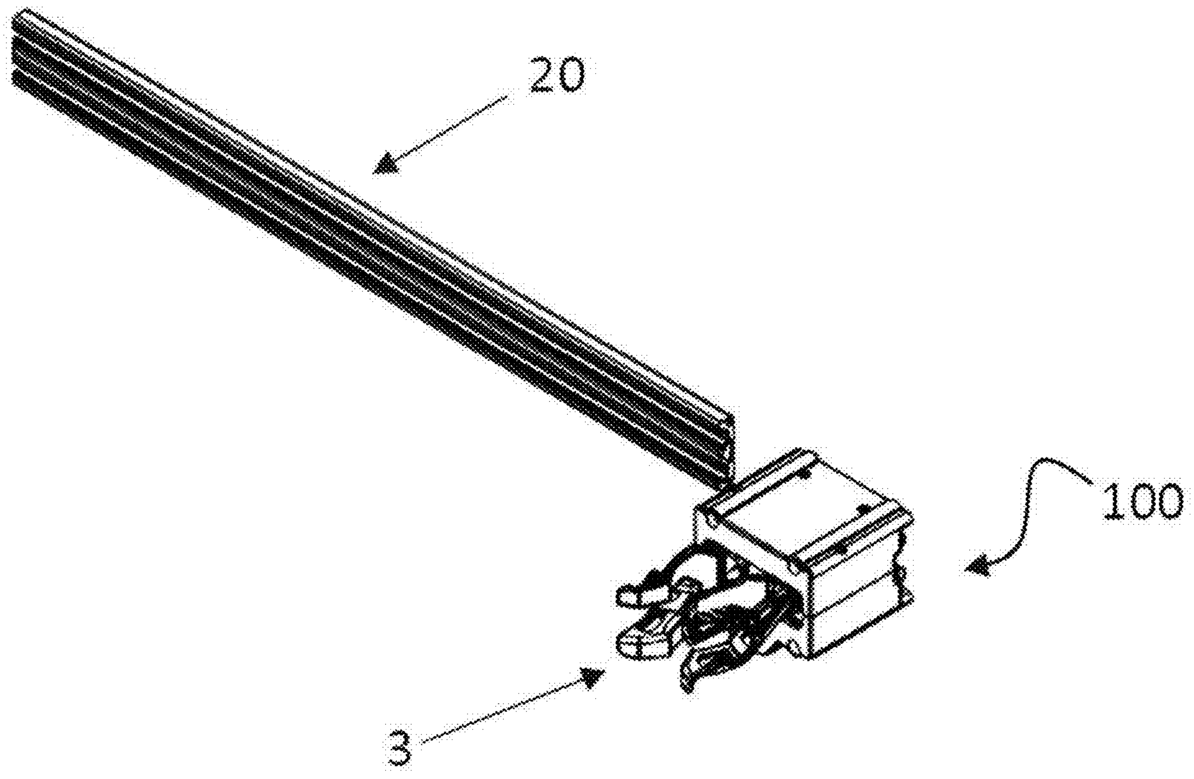
Figure 5C:
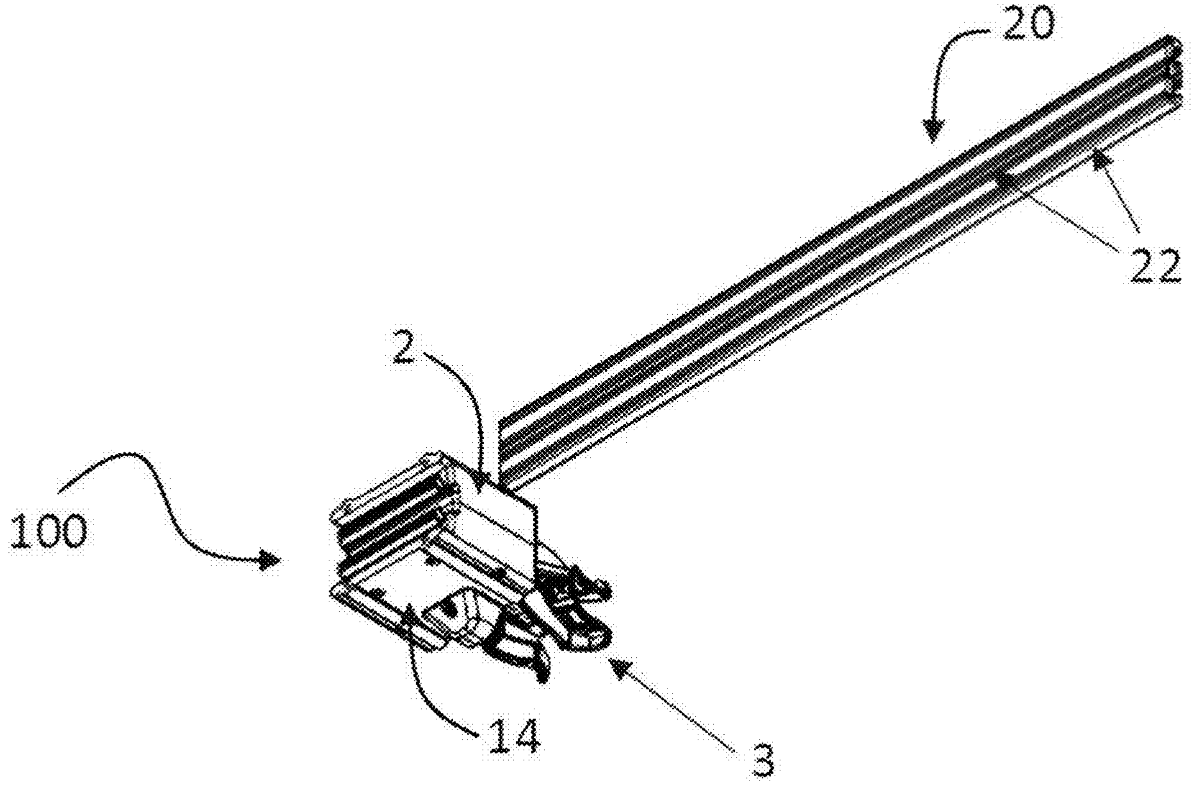

Referring to FIGS. 5A-5C, the holder assembly 100 is slidably mountable to a track 20. The track 20 has one or more channels 20 for slidably connecting to an outer surface of the back of the holder assembly 100 as seen in FIG. 5C. The back side of the holder assembly 100 is configured with one or more prongs which extend along the back side such that the back side slidably mates with the track 20 and channels 22 thereto. The holder assembly 100 is slidable along a length of the track 20 and the track 20 is configured to support a plurality of holder assemblies 100 thereon.

Figure 6A:
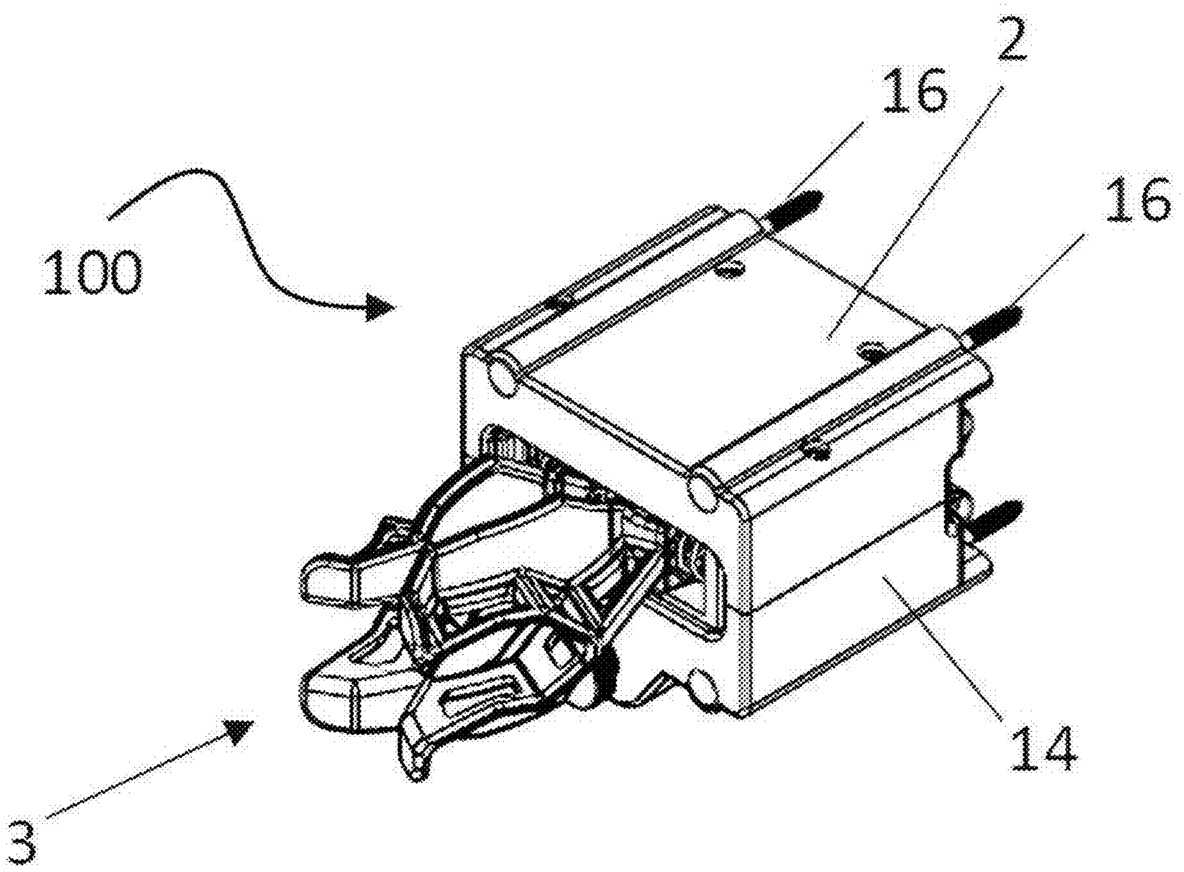
FIGS. 6A-6B illustrate a mechanism for directly mounting the holder assembly to a surface without the track.
Figure 6B:
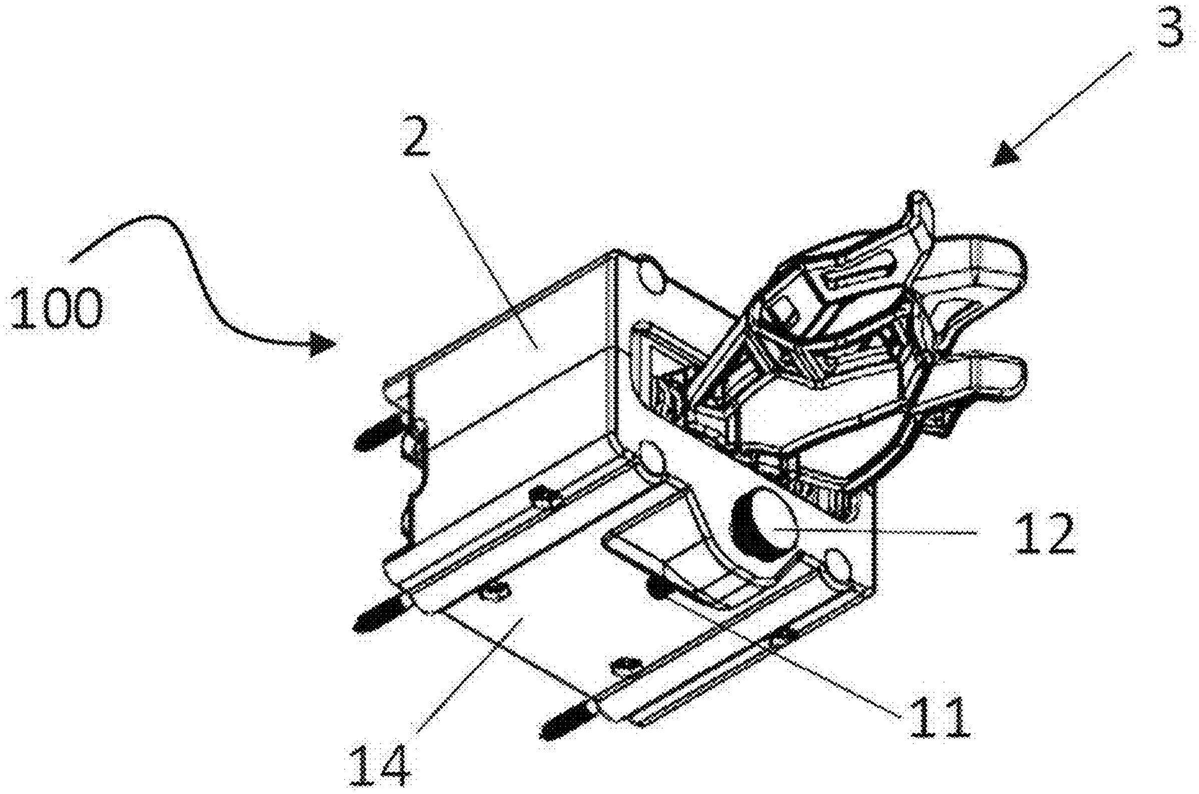

Referring to FIGS. 6A and 6B, additionally, or alternatively, the holder assembly 100 can be secured directly to a surface in a stationary manner and thus can be used to hold a variety of objects without requiring the track 20 for mounting. The surface can be an upright surface 400 such as a wall and can be secured by way of one or more screws can be provided to extend through apertures in the housing itself. In the embodiment illustrated the holder assembly can accommodate up to four fasteners and for example, apertures or channels extend along each of the four edges of the housing for using screws to secure the holder assembly 100 to a wall 400.

Figure 7A:
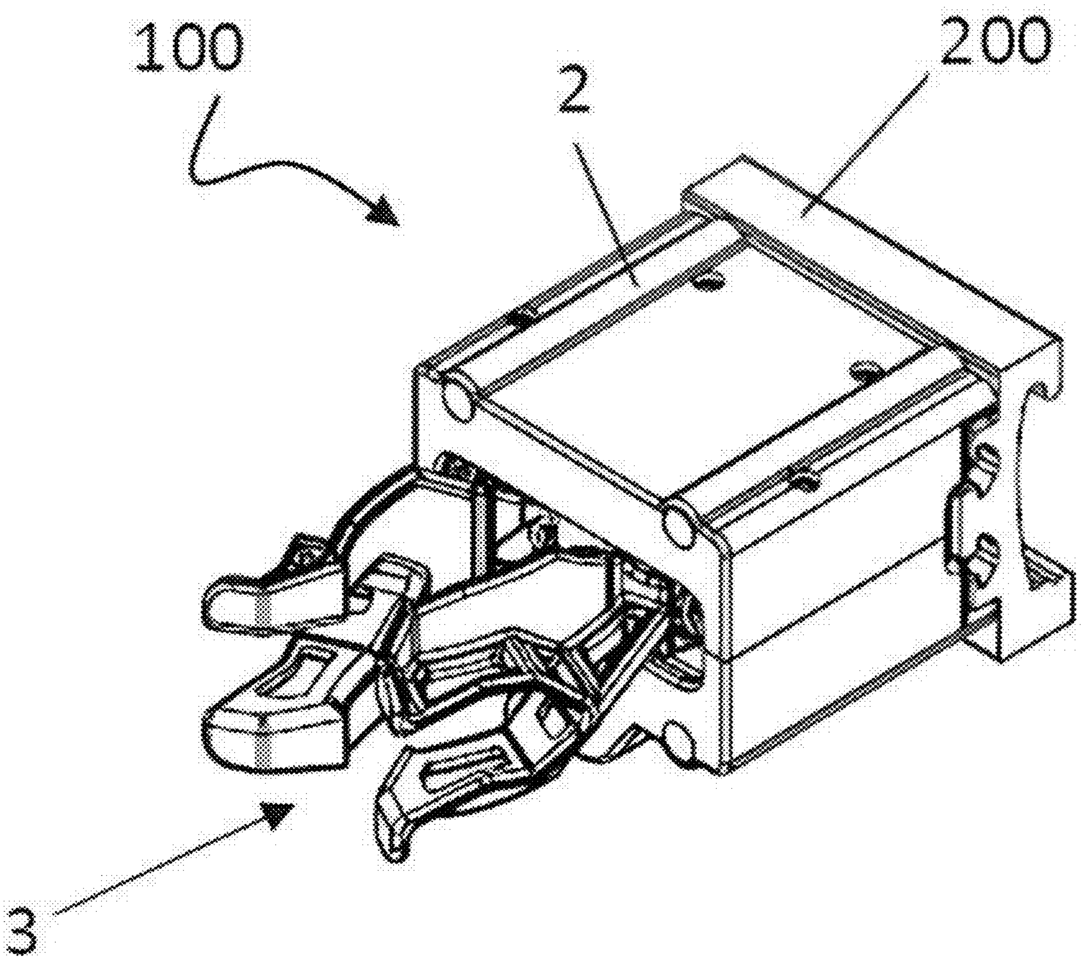
FIGS. 7A-7C illustrate an adapter mounting mechanism for the holder assembly.
Figure 7B:
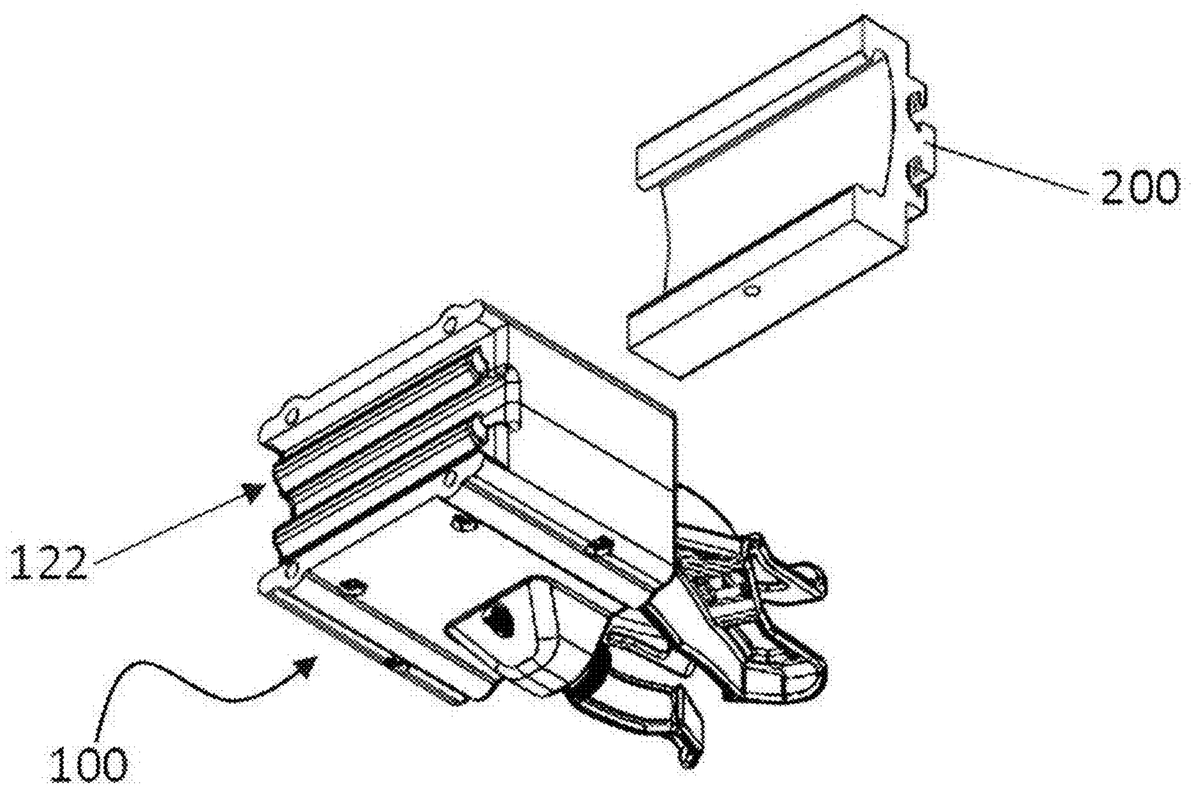
Figure 7C:
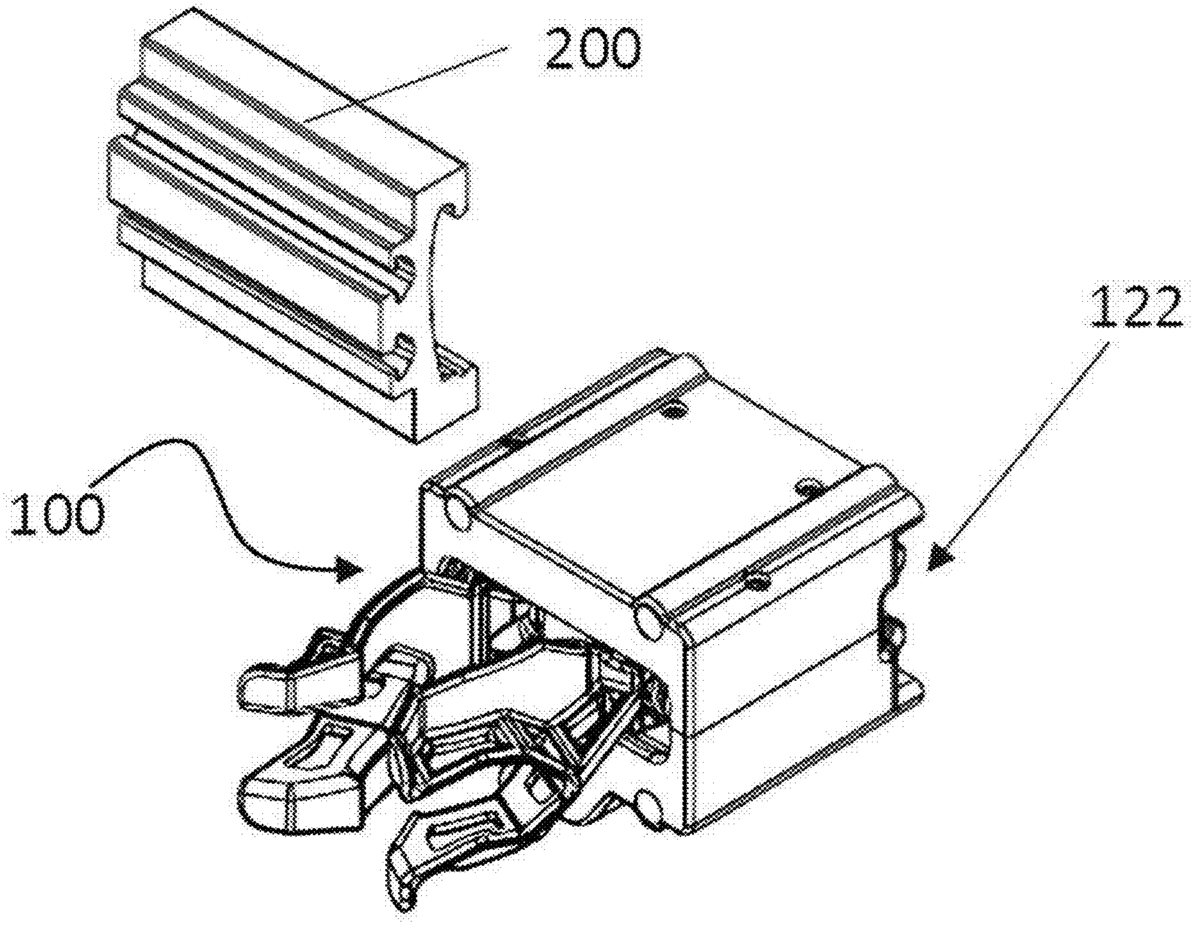

As illustrated in FIGS. 7A-7C, the holder assembly 100 may be connectable to pre-existing tracks by way of a track adapter 200. The track adapter 200 has a first side that is configured to connect to corresponding side surfaces 122 of the holder assembly 100 and to slide into mated connection with the one or more prongs on the holder assembly 100 which extend along the back side of the holder assembly 100. The adapter 200 has a length that may be substantially equal to the length of the housing and have an opposing side that configured to snap, slide, and/or connect to various pre-existing track materials.

Figure 8A:
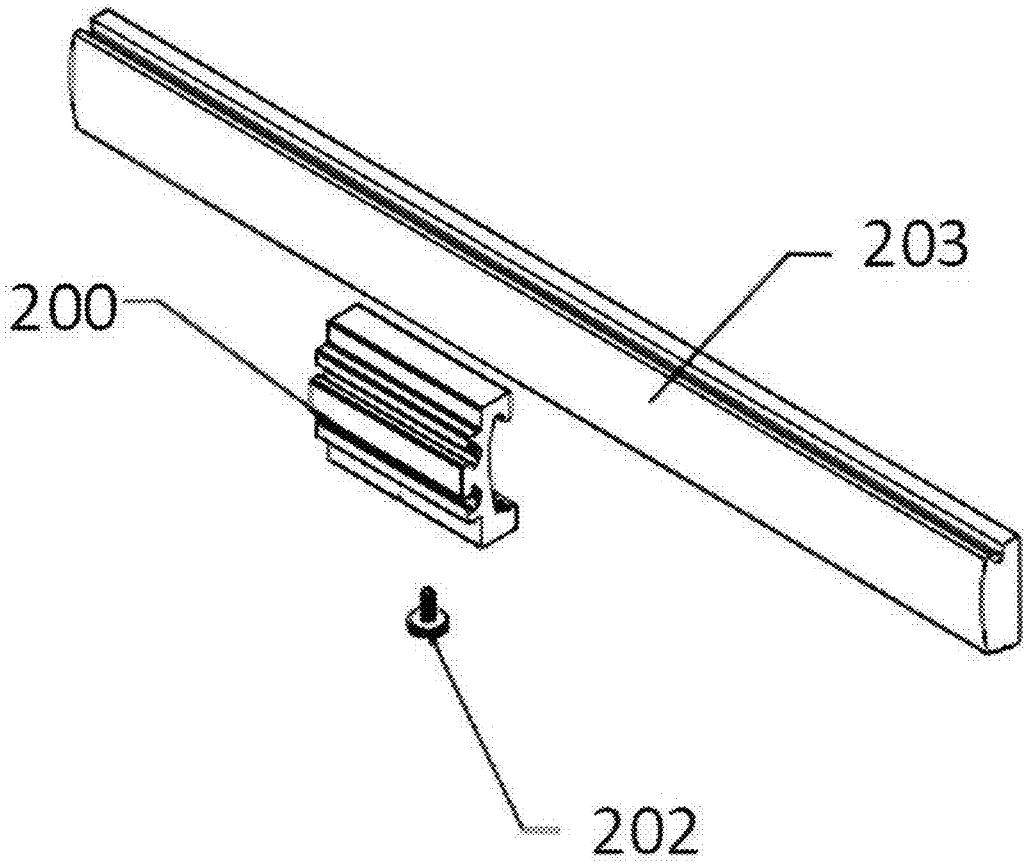
FIGS. 8A-8B illustrate the adapter mounting for the holding assembly.
Figure 8B:
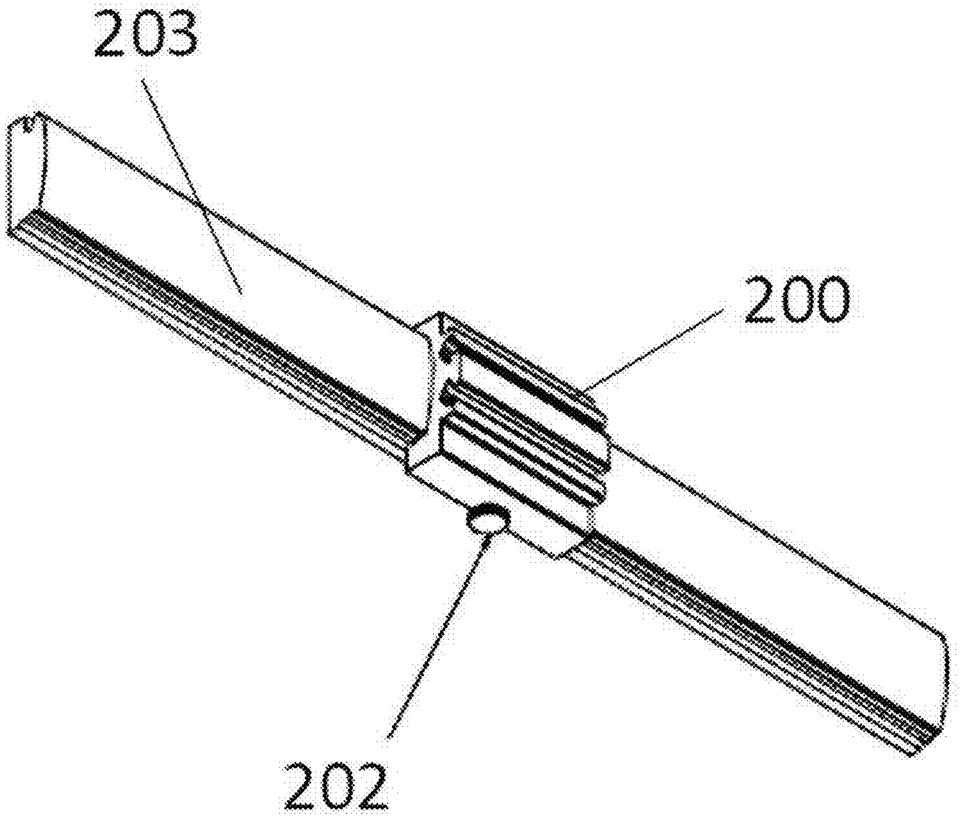
Figure 9:
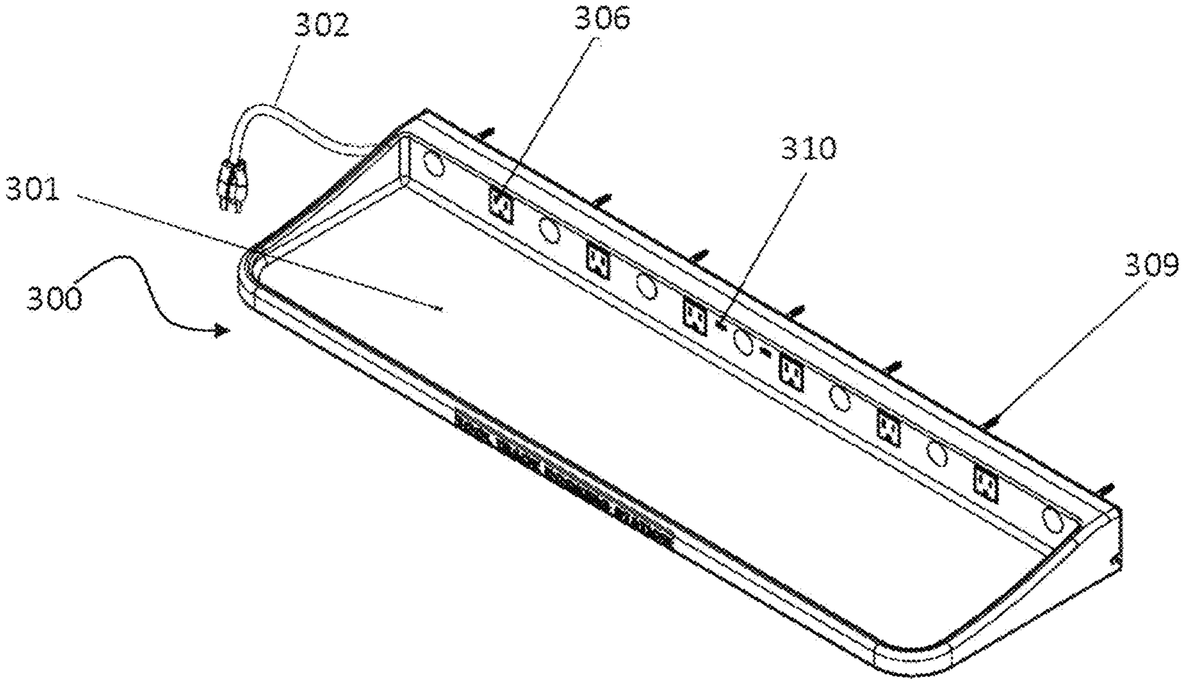
FIG. 9 is a front view of a docking station and storage mount.

In FIGS. 8A and 8B, the adapter 200 may also be provided with an aperture to receive a fastener 202 for tightening and securing the adapter 200 in connection with a track 203. The back surface of the adapter 200 is configured with an upper and lower lip and a cavity therebetween so that the adapter 200 can connect to a track 203 having various channel configurations.

FIGS. 9-11B illustrate a multi-use docking station and/or shelf which may be provided alone or with one or more holder assemblies and optional track and/or adapter for mounting. The multi-use docking station and/or shelf is illustrated at 300 and in the embodiment where the shelf 300 is provided with the holder assemblies the components provide a full-service storage and charging station which can be installed in any of the environments discussed herein.

Figure 10A:
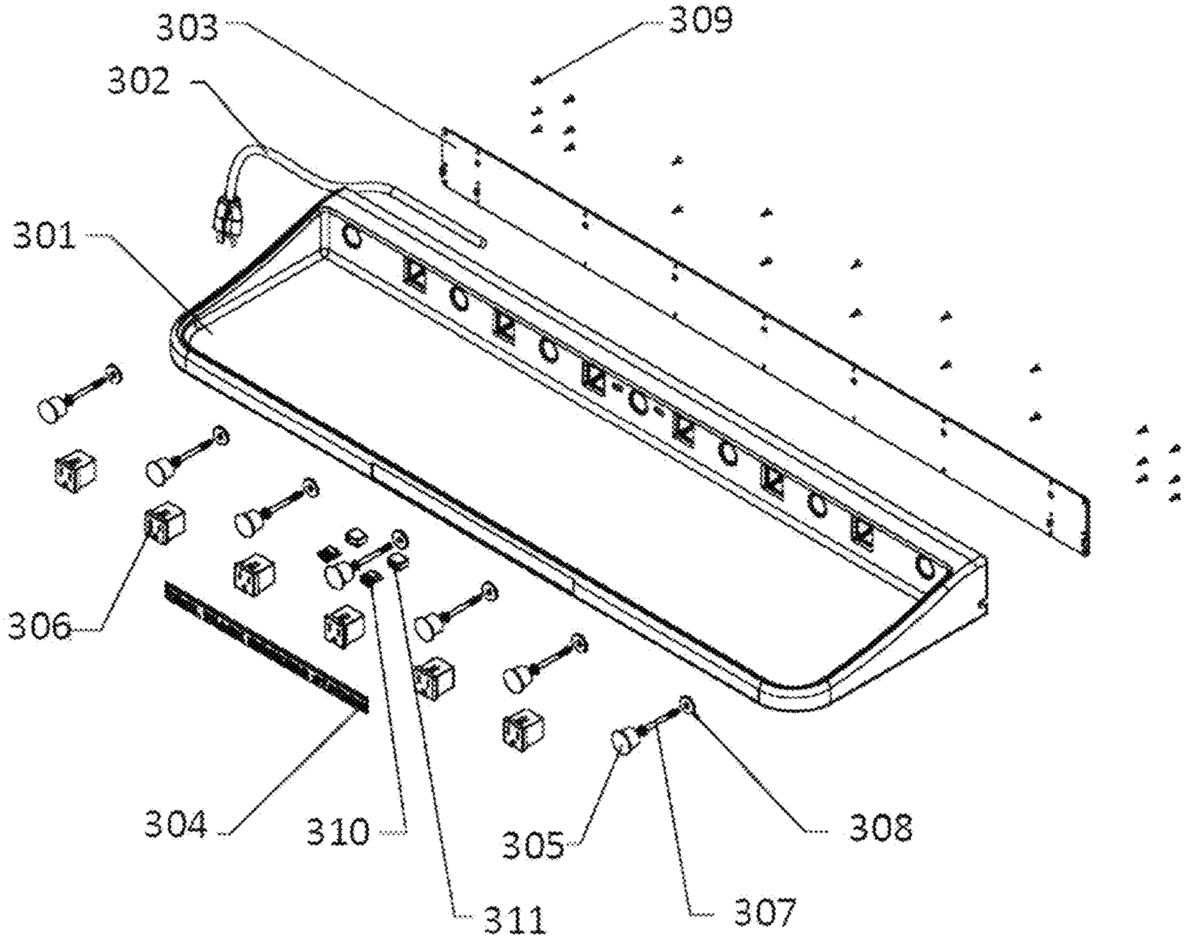
FIGS. 10A and 10B are exploded views of the docking station.
Figure 10B:
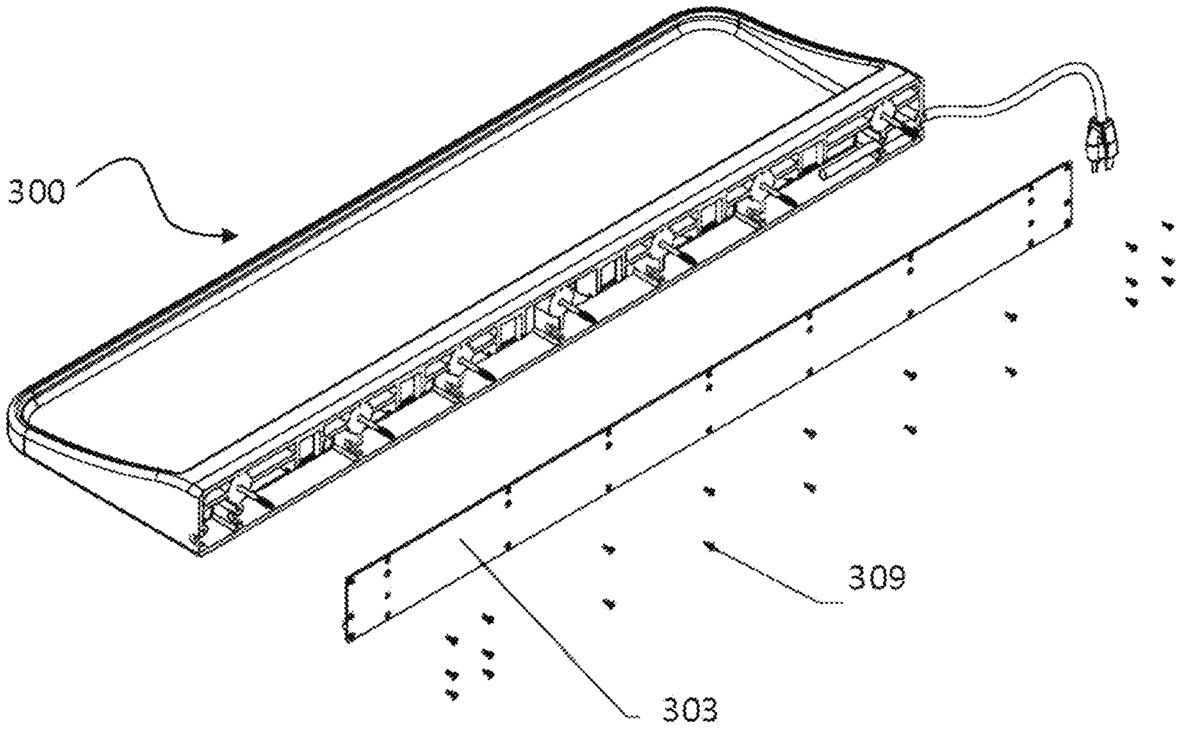

The shelf 300 may be constructed of HDPE and having a substantially flat horizontal surface for storage of one or more items thereon. The shelf 300 is configured to support up to 50 pounds on the surface 301. A lip is provided around a perimeter of the flat storage surface. A back wall of the shelf 300 is provided with one or more charging solutions such as AC/DC power, battery connections, and USB. A power cord extends from a side of the shelf 300 and allows for connection to an extension cord and for use with wall or other outlets to provide power to the shelf 300 for charging. FIGS. 10A and 10B are exploded view of one embodiment of construction of the shelf 300.

In further detail, the shelf provides a shelf surface 301 terminating in a vertical back wall which is adapted with openings for electrical connections. The back wall provides a rear cavity for holding electrical components therein and is closed with a back cover 303. The back cover 303 is adapted with apertures for receiving fasteners 309 for securing the back cover 303 to the back wall as well as securing the shelf 300 to a vertical wall surface. The cavity behind the back wall also provides a space for receiving an electrical harness for AC/DC power and the cord 302 extends outward from a side thereof. The back wall supports one or more USB ports 310 and USB adapters 311 as well as one or more electrical receptacles 306 spaced apart along a length of the back wall 303. The back wall is also adapted with mounting openings for mounting the shelf 300 to the wall and the mounting openings then receive a mounting cap 305 with screw 307 and washer 308 for securing the shelf to the wall. An optional face plate 304 can be provided for adding a logo or design to the shelf.

Figure 11A:
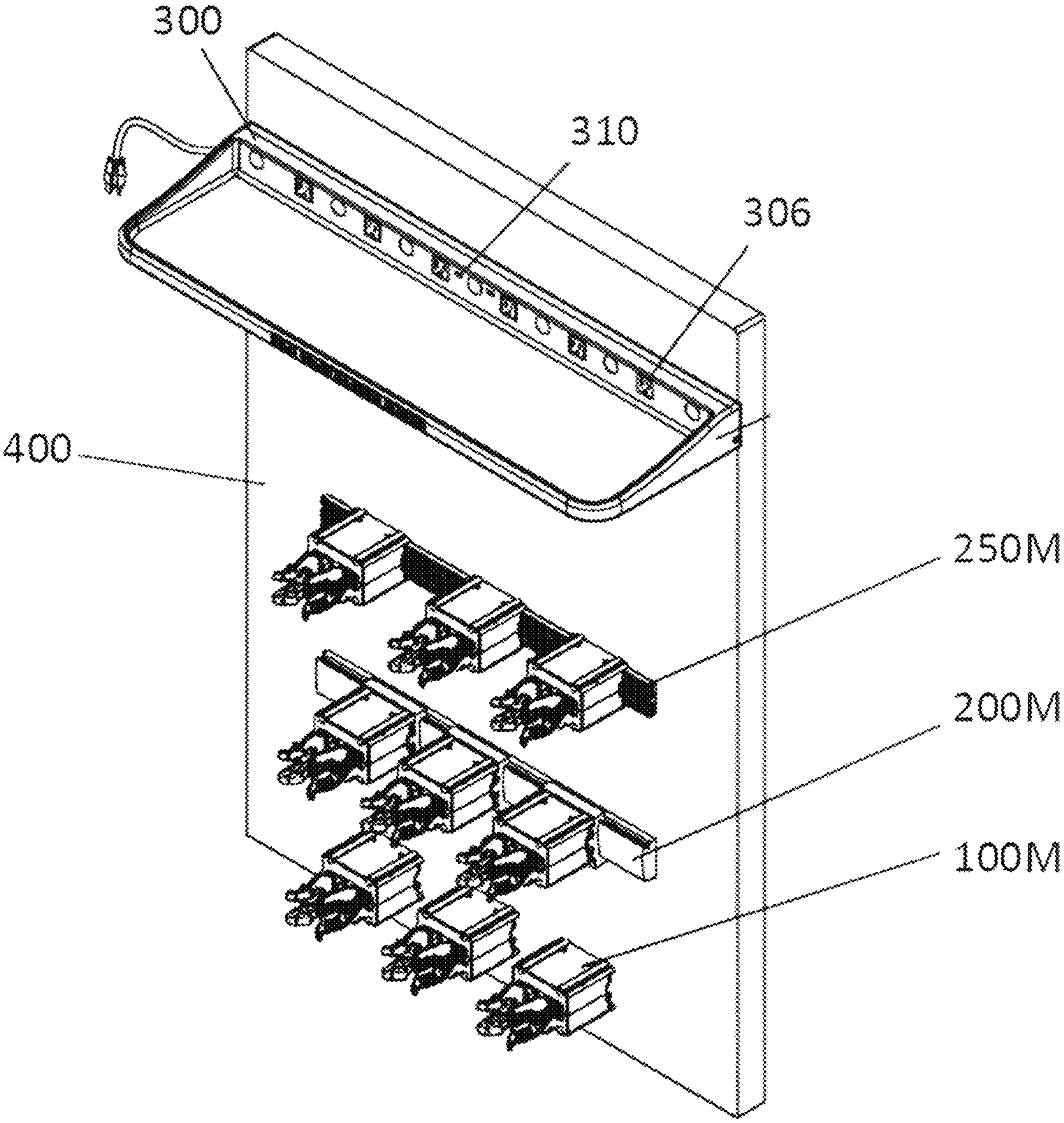
FIGS. 11A and 11B are perspective views of an installation of a system for storage and power for various objects according to one or more embodiments described herein.
Figure 11B:
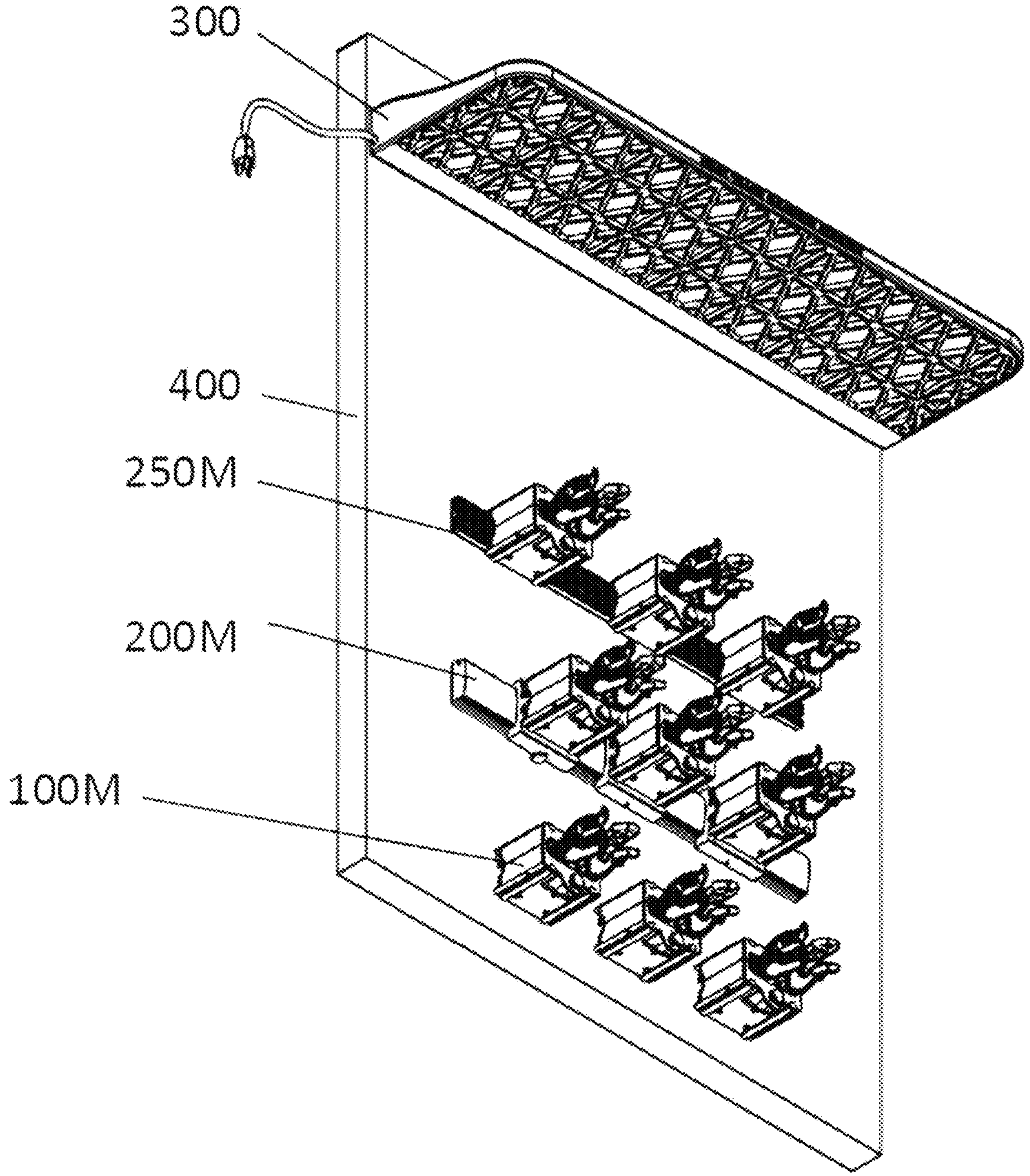

The shelf 300 can be used alone or in combination with the holder assemblies 100 in the manners illustrated in FIGS. 11A-11B. As such, in the embodiment wherein the holder assembly is configured for holding power tools or other objects requiring power, the devices can be stored with a holder assembly and charged using the shelf 300 with the items sitting on the shelf while charging. The shelf 300 and holder assemblies 100 may be mounted to any upright surface 400 such as a wall and in various configurations including but not limited to mounting 100M where the tool holder(s) 100 is mounted directly to the upright surface 400, mounting 200M wherein the tool holder(s) 100 is mounted to the track adapter 200 which is slidably connected to a mounting rail 202 that is mounted directly to the upright surface 400, or mounting 250M where the tool holder(s) 100 are mounted to T-channel brackets 250 which are mounted directly to the upright surface 400.

Figure 12A:
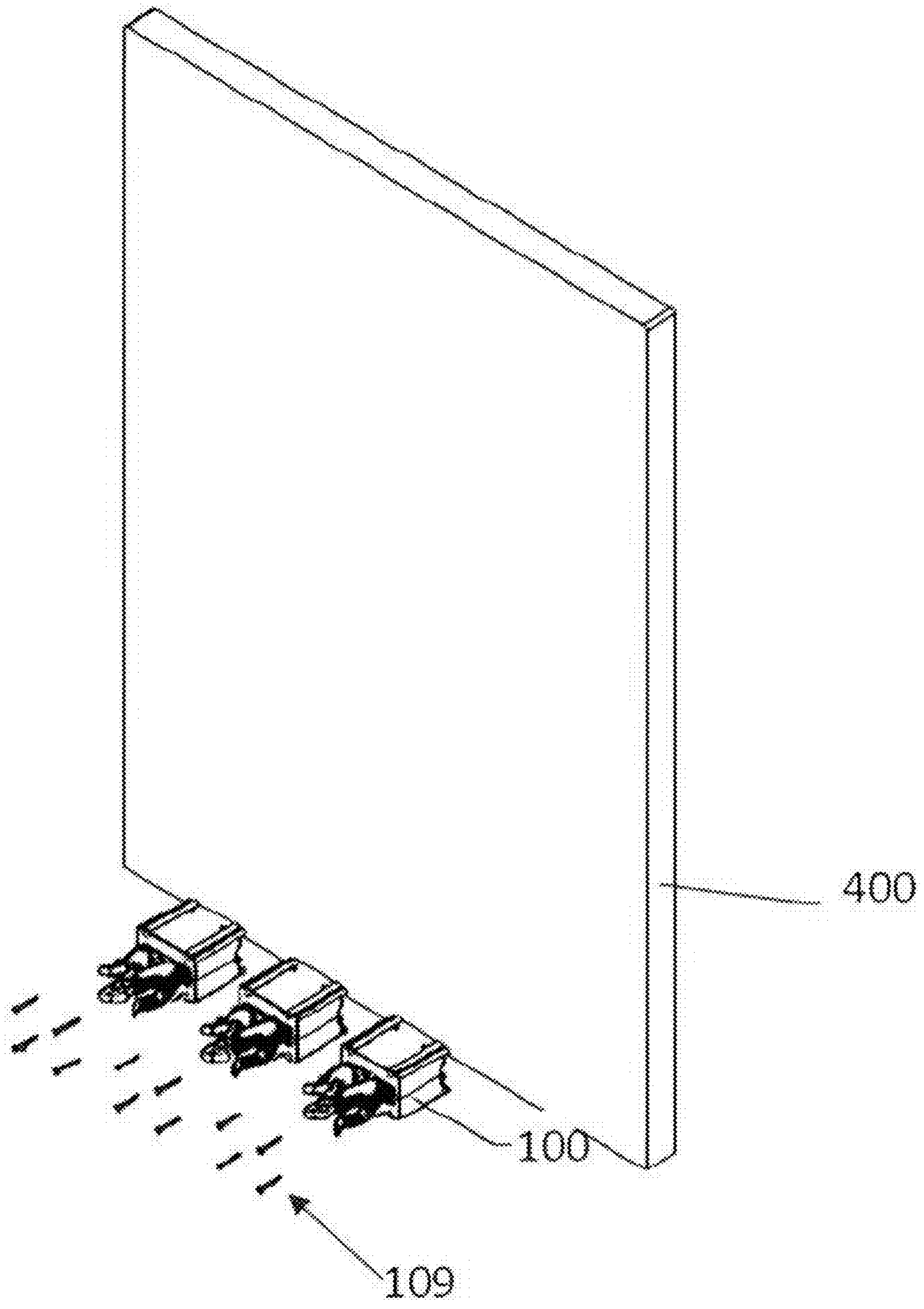
FIGS. 12A-12B illustrate a method of mounting holder assemblies to a wall.
Figure 12B:
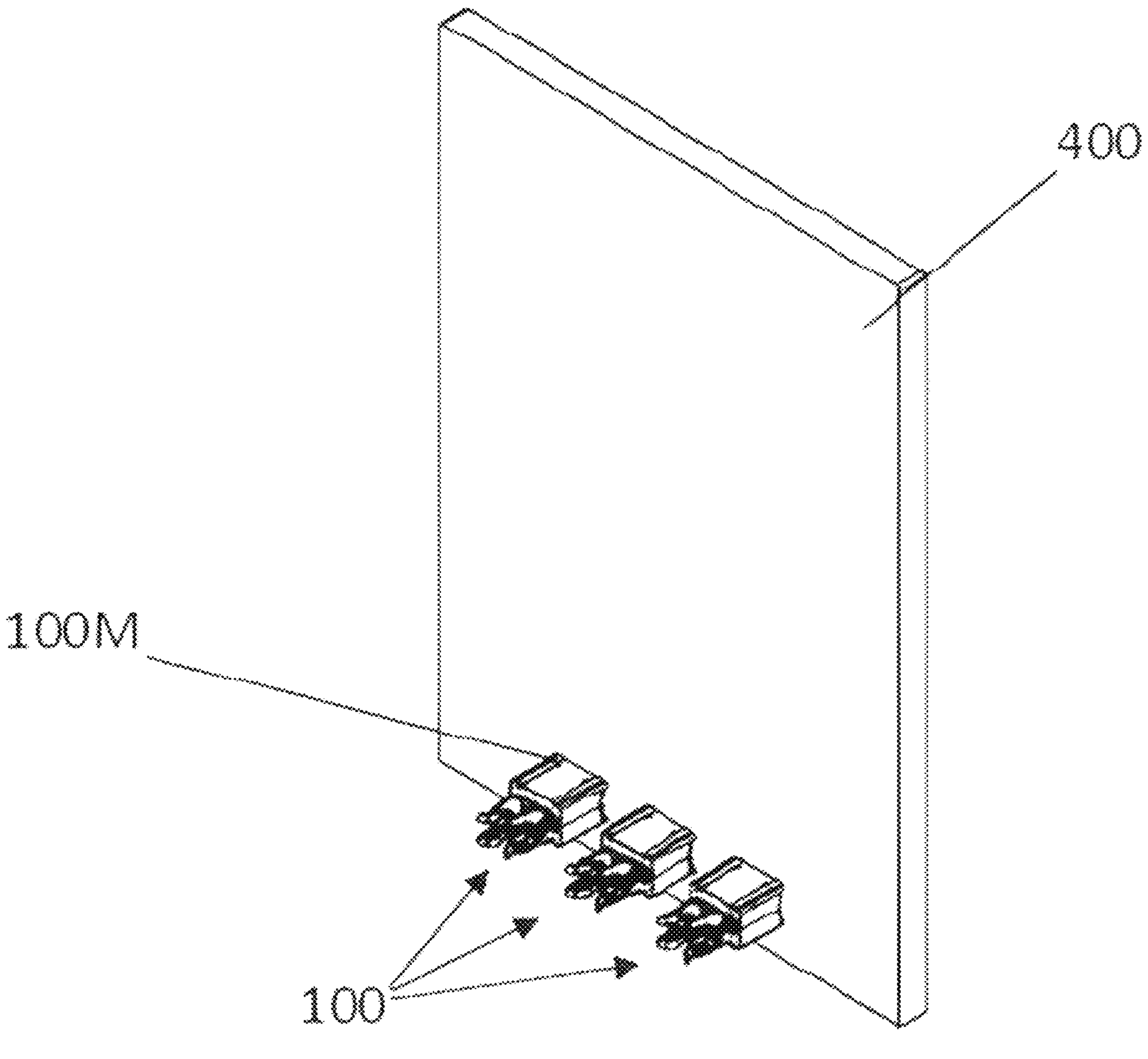

FIGS. 12A-12B illustrate a method of installing a plurality of holder assemblies 100 directly to a vertical surface such as a wall 400 using fasteners 109 such as stainless-steel screws.

Figure 13:
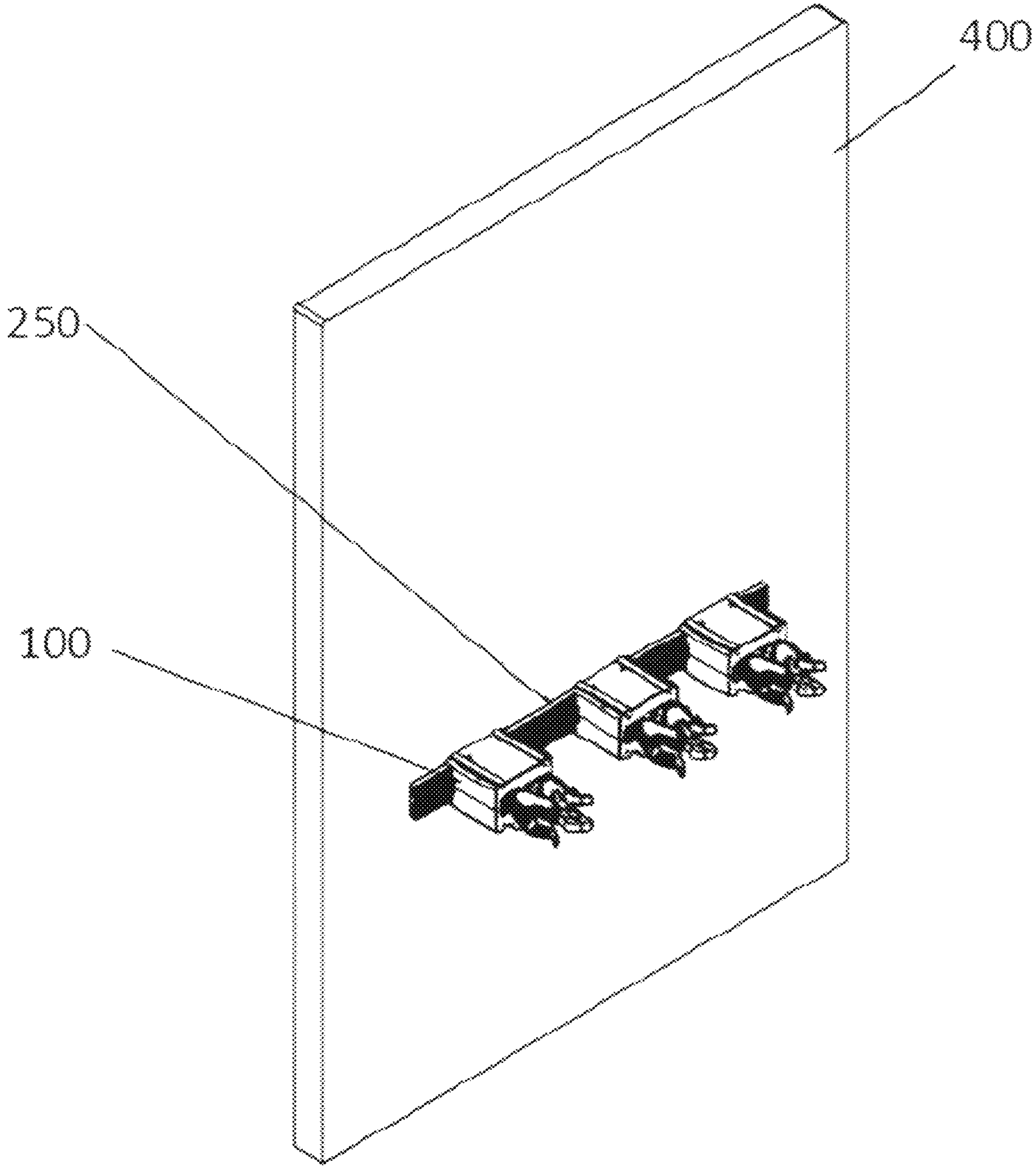
FIG. 13 illustrates a method of mounting holder assemblies and a track system to a wall.
Figure 14:
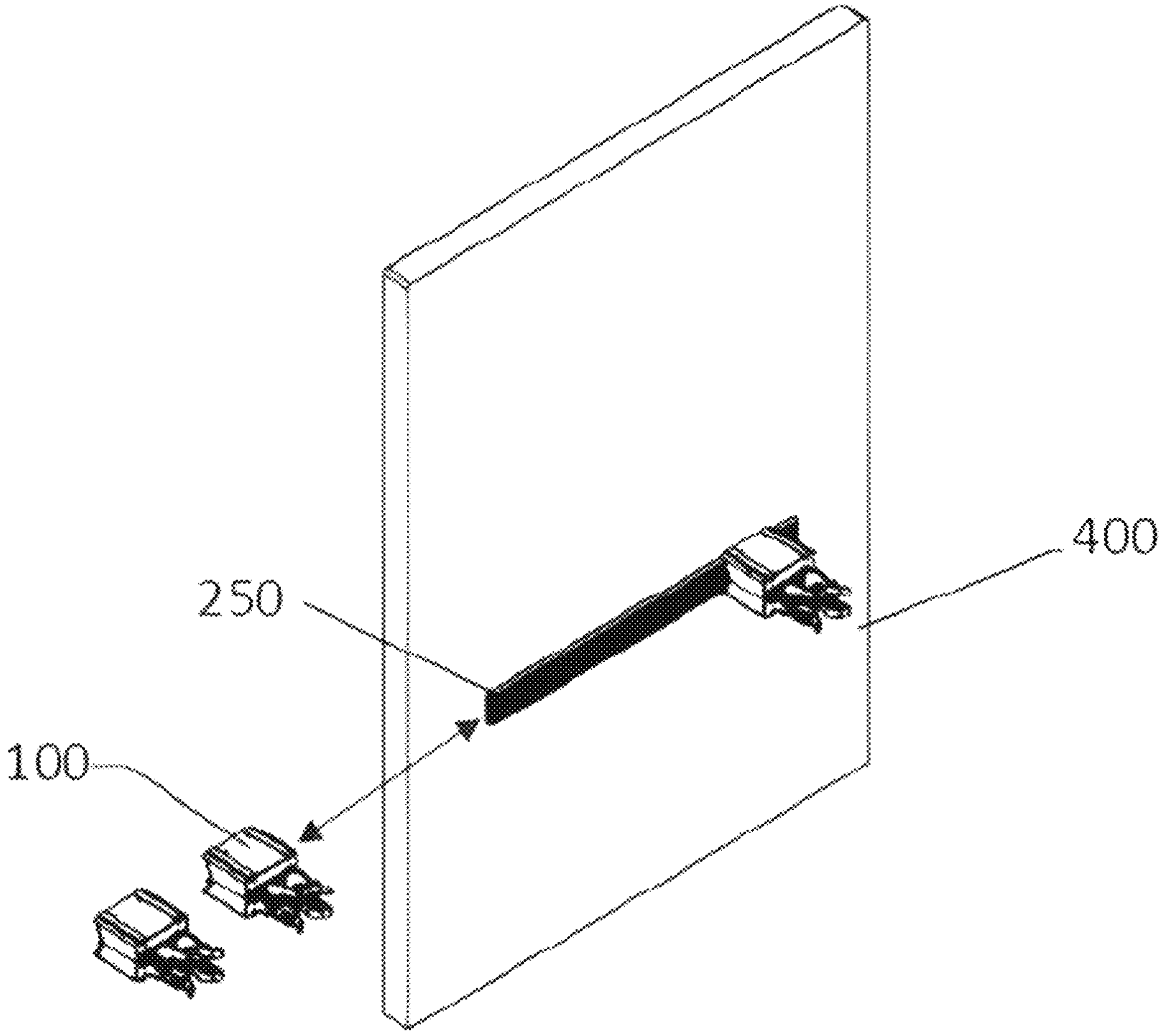
FIG. 14 illustrates another method of mounting holder assemblies and a track system to a wall.

In FIG. 13, a plurality of holder assemblies 100 are slid on a T channel bracket 250 from either side and the T channel bracket 250 is bolted or otherwise secured to the vertical surface, such as a wall 400. FIG. 14 illustrates a similar mounting option for the holder assemblies using a track secured to the upright surface.

Figure 15A:
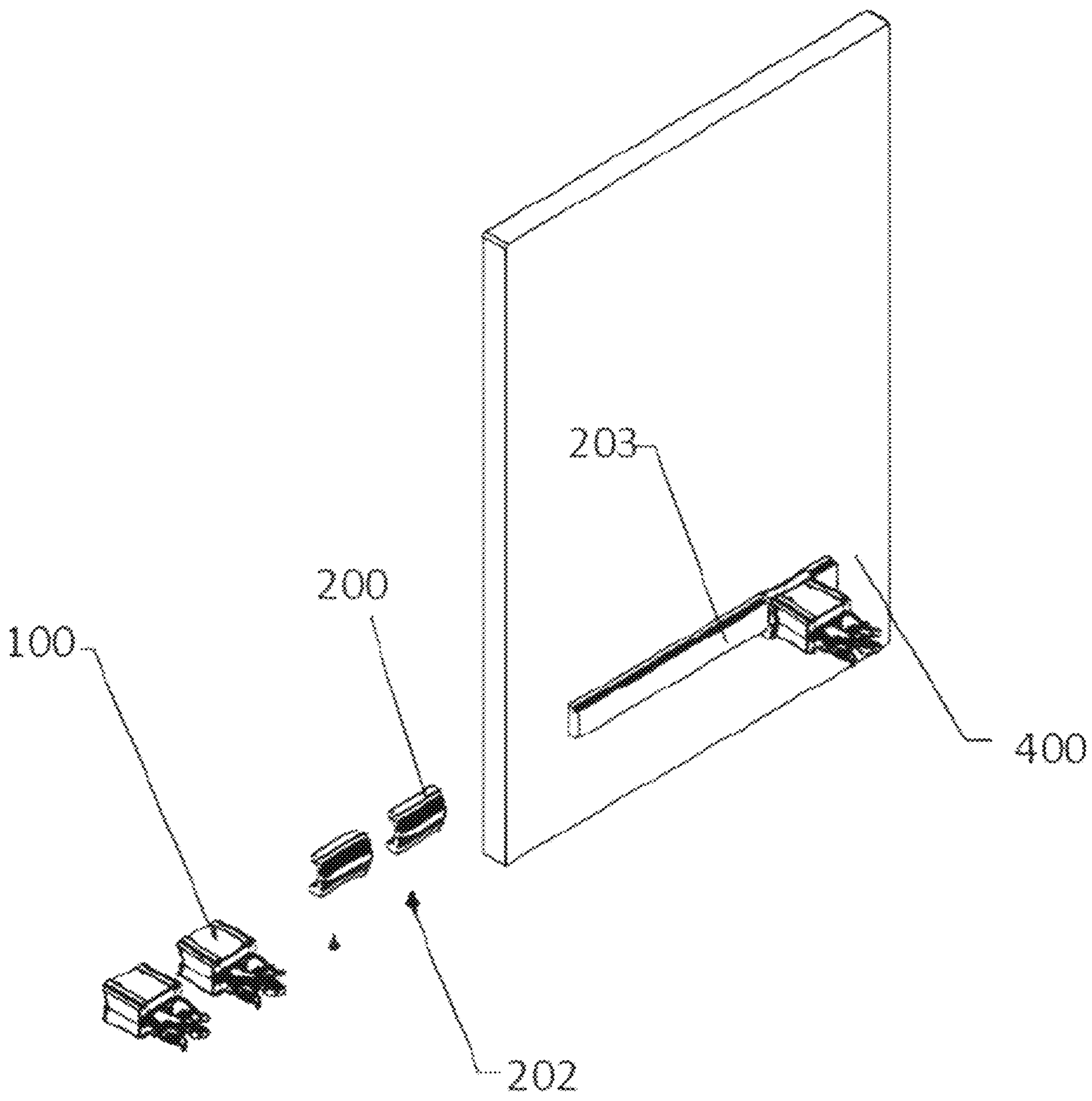
FIGS. 15A and 15B illustrate a method of mounting holder assemblies and adapter mountings to a track to a wall.
Figure 15B:
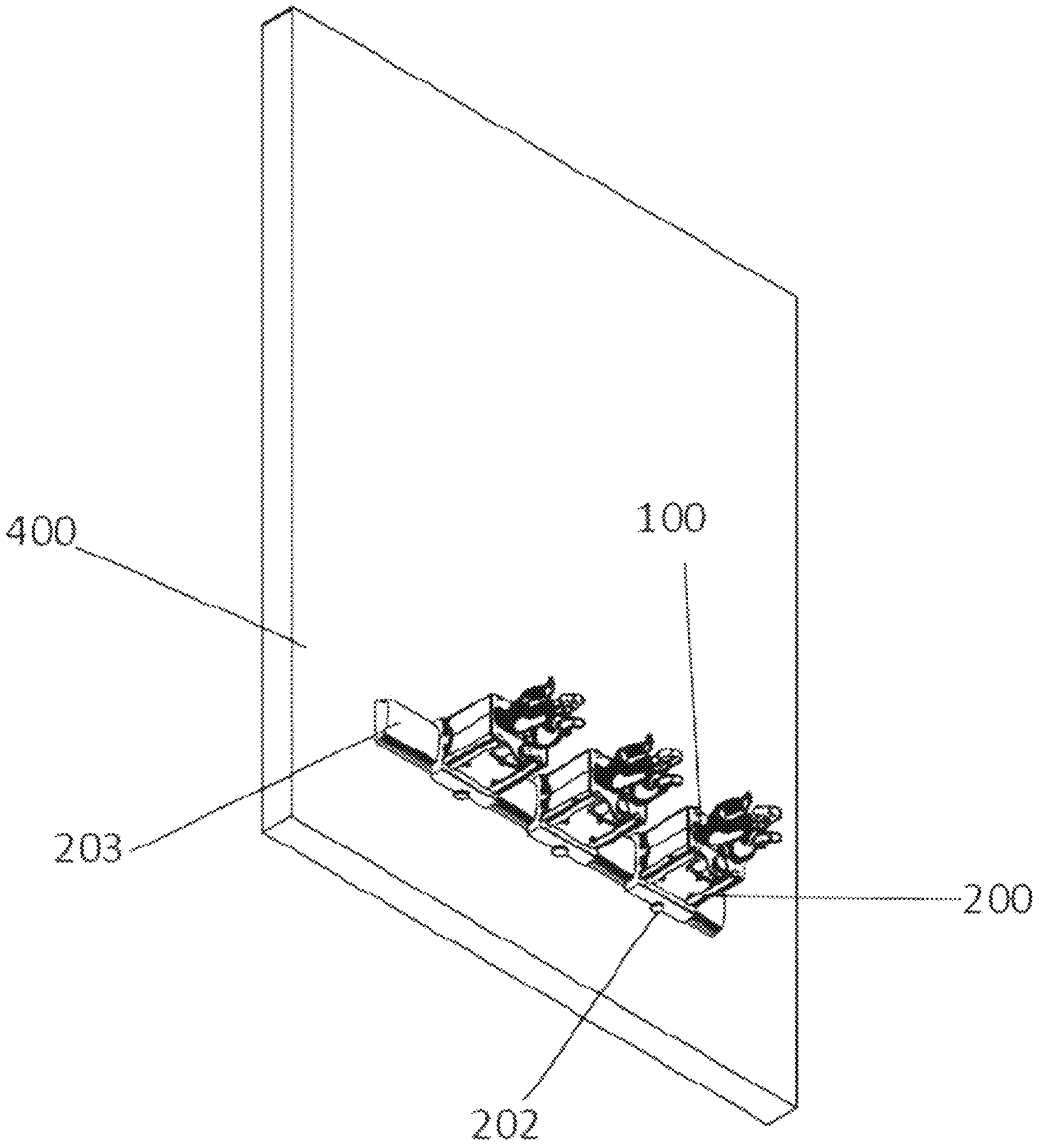

FIGS. 15A-15B illustrate a method of securing a plurality of holder assemblies 100 to a track that is mounted on a vertical surface, where the adapter 200 is used to connect the holder assembly 100 to the track and the adapter supporting the holder assembly is secured to the track with a tightening fastener.

Although the present disclosure has been described with reference to preferred embodiments, workers skilled in the art will recognize that changes may be made in form and detail without departing from the spirit and scope of the disclosure.

The invention claimed is:

1. A storage system for one or more objects comprising:

a housing having a top portion and a bottom portion and an outer rear surface having at least one prong extending along a length of the outer rear surface;

a pair of opposed clamping arms extending outwardly from a front face of the housing and wherein each arm has an angled object contact surface for contacting the object and forcing the arms apart when the object is forced into a space between the opposing clamping arms, and wherein each arm is a spring biased arm; and a track having a height and a depth;

wherein the housing is slidably connected to and removably supported on the track, wherein the track is mountable to an upright surface, wherein the housing further comprises a clamp adjustment mechanism for selectively increasing or decreasing a distance between each arm in the pair of opposed clamping arms for clamping objects of varying sizes between the arms, and wherein the clamp adjustment mechanism comprises a wedge positioned in the housing and between ends of the opposed clamping arms within the housing and wherein the wedge is moveable with respect to a stationary mount at a rear of the housing by way of rotation of an adjustment screw.

2. The storage system of claim 1 wherein the at least one prong extending along the length of the outer rear surface of the housing is configured to mate with at least one channel extending along a first surface of the track.

3. The storage system of claim 1 wherein the housing and the pair of opposed clamping arms are constructed of high-density polyethylene.

4. The storage system of claim 3 wherein the contact surface of each arm of the opposed clamping arms is provided with a rubberized coating or cover.

5. The storage system of claim 1 wherein the arms are configured to clamp an object having a circumference in the range of approximately ¾ inches to approximately 7 inches.

6. The storage system of claim 1 wherein the opposed clamping arms are configured to hold an object having a weight of up to 35 lbs.

7. The storage system of claim 1 and further comprising an adapter having a front surface for coupling to the at least one prong extending along the length of the outer rear surface of the housing, and a rear surface that is configured to couple to the channel such that the adapter couples the housing to the track.

8. The storage system of claim 1 wherein the housing is a first housing slidably connectable to the track and further comprising additional housings also slidably connectable to the track.

* * * * *